(12) United States Patent
Chou

(10) Patent No.: US 12,459,172 B2
(45) Date of Patent: Nov. 4, 2025

(54) FOAM BLEND INCORPORATING PHASE CHANGE MATERIAL AND METHOD FOR MAKING FOAMED SHOE BODY USING THE SAME

(71) Applicant: FENG TAY ENTERPRISES CO., LTD., Yunlin County (TW)

(72) Inventor: Chien-Hsin Chou, Yunlin County (TW)

(73) Assignee: FENG TAY ENTERPRISES CO., LTD., Yunlin County (TW)

( * ) Notice: Subject to any disclaimer, the term of this patent is extended or adjusted under 35 U.S.C. 154(b) by 145 days.

(21) Appl. No.: 18/494,777

(22) Filed: Oct. 26, 2023

(65) Prior Publication Data

US 2025/0135692 A1  May 1, 2025

(51) Int. Cl.
*B29C 44/56* (2006.01)
*B29C 44/02* (2006.01)
(Continued)

(52) U.S. Cl.
CPC .............. *B29C 44/56* (2013.01); *B29C 44/02* (2013.01); *B29C 71/02* (2013.01);
(Continued)

(58) Field of Classification Search
CPC ................ B29C 44/56; B29C 44/5618; B29C 44/5636; B29C 44/5645; B29C 44/569;
(Continued)

(56) References Cited

U.S. PATENT DOCUMENTS

| 2021/0078276 A1 | 3/2021 | Baghdadi et al. |
| 2021/0214536 A1 | 7/2021 | Tateishi et al. |

FOREIGN PATENT DOCUMENTS

| CN | 105061803 A | 11/2015 |
| CN | 110039864 A | 7/2019 |

(Continued)

OTHER PUBLICATIONS

Taiwanese Search Report for TW112128497, Issued on Apr. 1, 2024, Total of 3 page.
European Search Report for EP23206246, Issued on Apr. 15, 2024, Total of 2 page.
English Abstract for CN111234400A, Total of 1 page.
English Abstract for CN111748143A, Total of 1 page.
English Abstract for CN116041836A, Total of 1 page.
English Abstract for CN110039864A, Total of 1 page.
(Continued)

*Primary Examiner* — Stella K Yi
(74) *Attorney, Agent, or Firm* — Apex Juris, pllc; Hilde M. L. Coeckx

(57) ABSTRACT

Provided is a foam blend incorporating a phase change material for foaming and making a foamed shoe body, comprising a thermoplastic material, a blowing agent, a crosslinking agent and a phase change material; the phase change material is added in an amount based on the total content of the thermoplastic material, and is mixed with the thermoplastic material in an amount of no more than 15 phr, wherein the transition temperature of the phase change material is 45° C.-100° C. Another embodiment provides a method for making a foamed shoe body from a foam blend, comprising the steps of filling the foam blend into a mold for heating and foaming to form a semi-finished product of the foamed shoe body, and placing the semi-finished product of the foamed shoe body in an aging environment for shrinking and molding into a finished product of the foamed shoe body. The method thus can shorten the time of cooling and shrinkage of the foamed shoe body and save energy consumption in the manufacturing process.

11 Claims, 2 Drawing Sheets

(51) Int. Cl.
 *B29C 71/02* (2006.01)
 *B29K 105/00* (2006.01)
 *B29K 105/04* (2006.01)
 *B29K 105/24* (2006.01)
 *B29L 31/50* (2006.01)

(52) U.S. Cl.
 CPC ............... *B29K 2105/0005* (2013.01); *B29K 2105/04* (2013.01); *B29K 2105/24* (2013.01); *B29L 2031/505* (2013.01)

(58) Field of Classification Search
 CPC ............ B29C 48/0012; B29C 48/0018; B29C 61/02; B29C 44/02; B29C 71/02
 See application file for complete search history.

(56) References Cited

FOREIGN PATENT DOCUMENTS

| | | |
|---|---|---|
| CN | 111234400 A | 6/2020 |
| CN | 111748143 A | 10/2020 |
| CN | 115477837 A | 12/2022 |
| CN | 116041836 A | 5/2023 |
| EP | 4245802 A2 | 9/2023 |
| TW | 201641033 A | 12/2016 |
| WO | 2021076090 A1 | 4/2021 |

OTHER PUBLICATIONS

English Abstract for TW201641033A, Total of 1 page.
English Abstract for CN115477837A, Total of 1 page.
English Abstract for CN105061803A, Total of 1 page.

FOAM BLEND INCORPORATING PHASE CHANGE MATERIAL AND METHOD FOR MAKING FOAMED SHOE BODY USING THE SAME

TECHNICAL FIELD

The present invention relates to the technology of sole materials and manufacturing processes thereof, in particular to a foam blend incorporating a phase change material and a method for making a foamed shoe body.

BACKGROUND

The shoe manufacturing process has been known in the art, in which midsole/outsole foaming can be divided into injection pre-foam (IP or IPF) and compression molded pre-foam (CMP). In the production of the foamed midsole/outsole, melted shoe raw materials to be foamed are usually filled into a mold, and then heated and foamed to form a semi-finished shoe material. When the mold is opened, the semi-finished shoe material expands instantaneously due to foaming, and then shrinks. The temperature of the external environment affects the dimensional shrinkage of the semi-finished shoe material. For example, when the external environment is under low temperature conditions (below normal temperature of 25° C.), the semi-finished shoe material is easy to cool and thus the shrinkage reduces. However, when the semi-finished shoe material is subsequently subjected to standing/application of a sizing agent and a treatment agent/oven/UV irradiation, the process temperature of the semi-finished shoe material increases and thus the shrinkage amount of the semi-finished shoe material increases, resulting in a significant dimension difference between the finished shoe material and the semi-finished shoe material. Instead, when the external environment is under high temperature conditions, the semi-finished shoe material easily gives rise to thermal shrinkage, and the shrinkage amount of the semi-finished shoe material increases. Therefore, the semi-finished shoe material is unstable in dimension after cooling and shrinkage due to the change of the external ambient temperature.

In order to control the stability of dimensional shrinkage of the semi-finished shoe material after being removed from the mold, the semi-finished shoe material after being removed from the mold is usually placed in an oven for cooling and shrinkage, so as to reduce the influence of the ambient temperature on the semi-finished shoe material. The oven is usually set to a multi-stage cooling. For example, the temperature condition is set to 70° C.-60° C.-50° C.-45° C.-45° C., that is, the temperature is set to 70° C. for cooling for a period of time and then gradually lowered to 45° C. for cooling, and the total time for cooling and shrinkage is set to 45 minutes. The multi-stage temperature control of the oven can slow down a dimensional shrinkage of the semi-finished shoe material.

However, the multi-stage temperature control of the oven relatively increases electric energy consumption, and the setting time of the semi-finished shoe material needs to match the multi-stage temperature conditions of the oven, so that the overall efficiency of the shoe manufacturing process cannot be improved.

SUMMARY OF THE INVENTION

In this regard, the objects of the present invention are to provide a foam blend incorporating a phase change material and a method for making a foamed shoe body using the same, which can shorten the time of cooling and shrinkage of a foamed shoe body and save energy consumption in the manufacturing process.

In order to achieve these objects, a foam blend incorporating a phase change material provided by the present invention is used for foaming and making a foamed shoe body. The foam blend incorporating a phase change material comprises a thermoplastic material, a blowing agent, at least one crosslinking agent and a phase change material. The blowing agent and the at least one crosslinking agent are mixed with the thermoplastic material, and the phase change material is added in an amount of no more than 15 phr based on the total content of the thermoplastic material to mix with the thermoplastic material, wherein the transition temperature of the phase change material is 45° C.-100° C.

In one embodiment, the transition temperature of the phase change material is 55° C.-70° C., and the phase change material is added in an amount of no more than 10 phr to mix with the thermoplastic material.

In one embodiment, the phase change material includes one or a combination of more than one of the group consisting of polyethylene glycol (PEG), a petroleum resin, a linear alkane ($C_{22}$-$C_{30}$), zinc octadecanoate and stearic acid. When the phase change material includes a combination of two or more of polyethylene glycol (PEG), a petroleum resin, a linear alkane ($C_{22}$-$C_{30}$), zinc octadecanoate and stearic acid, the total amount of the phase change material added is between 5-10 phr.

In one embodiment, the at least one crosslinking agent is added in an amount of 0.1-1.5 phr based on the total content of the thermoplastic material to mix with the thermoplastic material.

In one embodiment, the at least one crosslinking agent includes one or a combination of more than one of the group consisting of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP).

In one embodiment, when the at least one crosslinking agent includes any of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP), the crosslinking agent is added in an amount of between 0.1-1.5 phr; when the at least one crosslinking agent includes a combination of two or more of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis (tert-butylperoxy) hexane (DBPH), di(tert-butylperoxyisopropyl)benzene (BIPB), benzoyl peroxide (BPO), and dicumyl peroxide (DCP), each crosslinking agent is added in an amount of between 0.1-1.5 phr.

In one embodiment, the crosslinking agent includes a combination of 1,1'-bis-(tert-butyl-peroxy)-3,3,5-trimethylcyclohexane (TMCH) and di(tert-butylperoxyisopropyl) benzene (BIPB).

In one embodiment, the content of the thermoplastic material accounts for 100 parts by weight of the total content of the foam blend, and the thermoplastic material includes one or a combination of more than one of the group consisting of polyurethane (PU), polyethylene (PE), ethylene vinyl acetate (EVA), a polyolefin elastomer (POE), a thermoplastic elastomer (TPE), a synthetic rubber and natural rubber. The blowing agent is added in an amount of 5-10 phr based on the total content of the thermoplastic material to mix with the thermoplastic material.

The present invention further provides a method for making a foamed shoe body from a foam blend incorporating a phase change material, comprising the following steps:

Step S1: mixing the aforementioned thermoplastic material, the aforementioned blowing agent, the aforementioned crosslinking agent and the aforementioned phase change material to form the foam blend, wherein the phase change material is added in an amount of no more than 15 phr based on the total content of the thermoplastic material to mix with the thermoplastic material and wherein the transition temperature of the phase change material is 45° C.-100° C.;

Step S2: filling the foam blend into a mold for heating and foaming to form a semi-finished product of the foamed shoe body, wherein the phase change material stores thermal energy during the foaming process; and Step S3: removing the semi-finished product of the foamed shoe body from the mold after the mold opening, and placing the semi-finished product of the foamed shoe body in an aging environment, wherein the temperature of the aging environment is not greater than the transition temperature of the phase change material, and the phase change material releases the stored thermal energy in the aging environment to shrink the semi-finished product of the foamed shoe body into a finished product of the foamed shoe body.

In one embodiment, in the Step S3, after the semi-finished product of the foamed shoe body is removed from the mold, it is first placed in a first aging environment for cooling and shrinkage, wherein the temperature of the first aging environment is set to 40° C.-45° C., and the time of cooling and shrinkage is between 15-30 minutes. The phase change material in the semi-finished product of the foamed shoe body releases the stored thermal energy, which promotes the thermal shrinkage of the semi-finished product of the foamed shoe body after the semi-finished product of the foamed shoe body is removed from the mold, so that the semi-finished product of the foamed shoe body forms a semi-finished product of a shrunk foamed shoe body in the first aging environment. Next, the semi-finished product of the shrunk foamed shoe body is removed from the first aging environment, and placed in a second aging environment for 7 days for curing and setting. The temperature of the second aging environment is between 0° C.-45° C., so that the semi-finished product of the shrunk foamed shoe body is set into a finished product of the foamed shoe body in the second aging environment, wherein, the second aging environment is an indoor environment, and the temperature of the second aging environment corresponds to the indoor temperature without the need of making any additional adjustment to room temperature, so that the semi-finished product of the shrunk foamed shoe body can be aged and set at room temperature in the second aging environment.

In one embodiment, the length dimension of the semi-finished product of the shrunk foamed shoe body is L1, the length dimension of the finished product of the foamed shoe body is L2, and the difference between the length dimension L2 of the finished product of the foamed shoe body and the length dimension L1 of the semi-finished product of the shrunk foamed shoe body is no more than 5%; the width dimension of the semi-finished product of the shrunk foamed shoe body is W1, the width dimension of the finished product of the foamed shoe body is W2, and the difference between the width dimension W2 of the finished product of the foamed shoe body and the width dimension W1 of the semi-finished product of the shrunk foamed shoe body is no more than 5%. In one preferred embodiment, the difference between the length dimension L2 of the finished product of the foamed shoe body and the length dimension L1 of the semi-finished product of the shrunk foamed shoe body is no more than 2%; the difference between the width dimension W2 of the finished product of the foamed shoe body and the width dimension W1 of the semi-finished product of the shrunk foamed shoe body is no more than 2%.

In one embodiment, in the Step S3, the aging environment is an indoor environment, and the temperature of the aging environment corresponds to an indoor temperature in a range of 0° C.-70° C. without the need of making any additional adjustment to room temperature. By the process of shrinking the finished product of the foamed shoe body, the semi-finished product of the foamed shoe body can be aged and set at room temperature in the aging environment throughout the process.

The effect of present invention is that the foam blend incorporating a phase change material has a phase change material having a particular transition temperature (45° C.-100° C.). Because the phase change material has a function of absorbing or releasing latent heat, when the foam blend is used to the process of foaming to make a foamed shoe body, the phase change material can store thermal energy during the foaming process. Because the temperature of the aging environment (0° C.-70° C.) is lower than the transition temperature of the phase change material (45° C.-100° C.), the phase change material in the semi-finished product of the foamed shoe body releases the stored thermal energy to maintain the semi-finished product of the foamed shoe body at a certain temperature, promote the thermal shrinkage efficiency of the semi-finished product of the foamed shoe body after mold opening, and shorten the time of cooling and shrinkage of the foamed shoe body. Moreover, in the Step S3 of the method, compared to the conventional technique, the temperature of the aging environment using low-temperature shrinkage conditions further saves energy consumption in the process. And the method of the present invention can also stabilize the setting shrinkage of the finished product of the foamed shoe body, improve the shrinkage yield of the manufacturing process, and thereby maintain the quality of the finished product of the foamed shoe body.

EMBODIMENTS OF THE INVENTION

Figure 1:
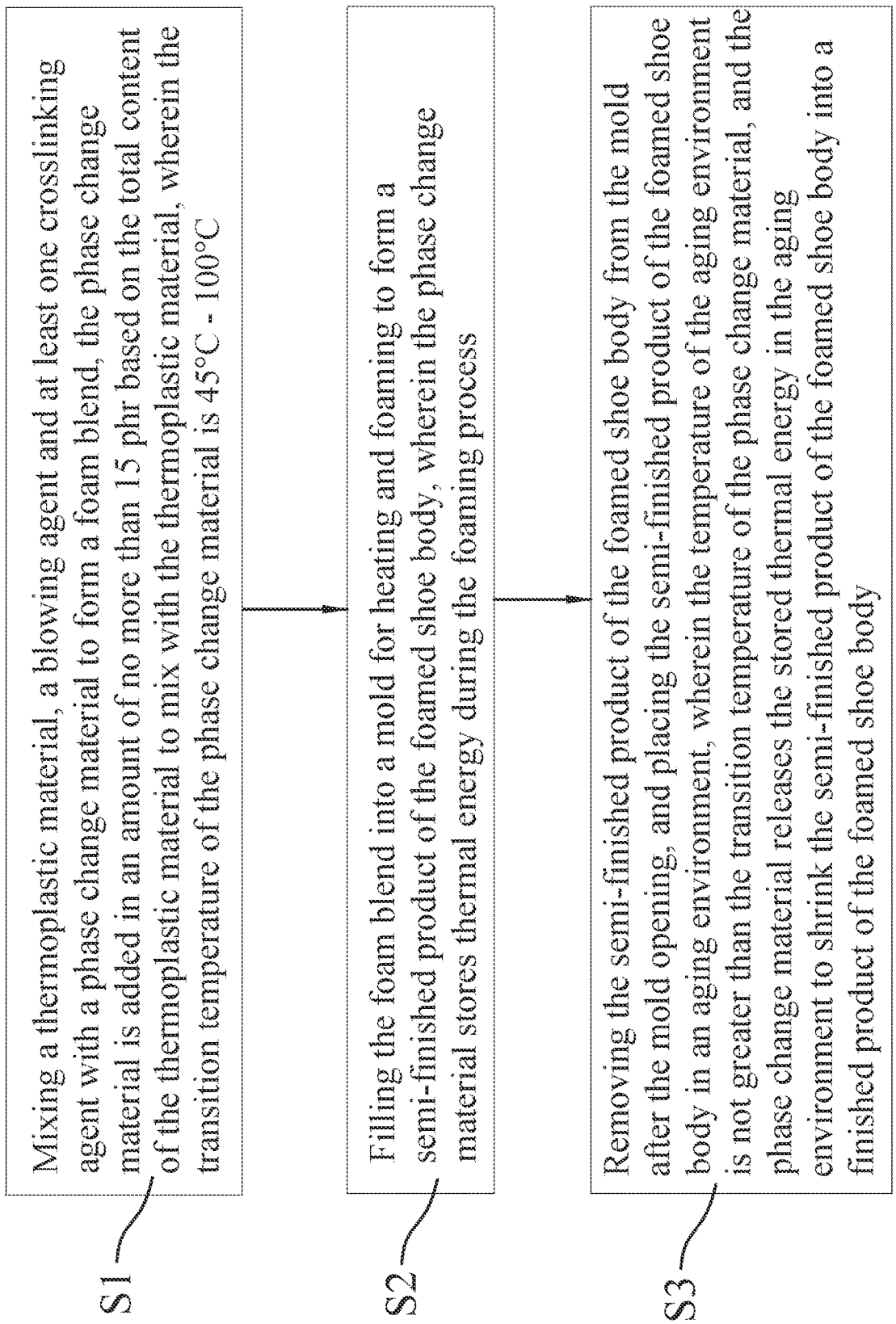
FIG. 1 is a flowchart showing the steps of the method of making a foamed shoe body from a foam blend incorporating a phase change material according to one preferred embodiment of the present invention.

In order to more clearly illustrate the present invention, preferred embodiments are given and described in detail below in combination with the accompanying drawings. The present invention provides a foam blend incorporating a phase change material for foaming to make a foamed shoe body. The foam blend incorporating a phase change material substantially comprises a thermoplastic material, a blowing agent, at least one crosslinking agent and a phase change material. The foam blend is formed by mixing the thermoplastic material, the blowing agent, the at least one crosslinking agent and the phase change material.

The thermoplastic material includes one or a combination of more than one of the group consisting of polyurethane (PU), polyethylene (PE), ethylene-vinyl acetate (EVA), an polyolefin elastomer (POE), a thermoplastic elastomer (TPE), a synthetic rubber and natural rubber, indicating that the thermoplastic material can be used alone or the thermoplastic material can be used in a combination of two or more of the aforesaid substances. Moreover, the content of the thermoplastic material is 100 parts by weight based on the total content of the foam blend, wherein when the thermoplastic material is a combination of two or more selected from polyurethane (PU), polyethylene (PE), ethylene-vinyl acetate (EVA), an polyolefin elastomer (POE), a thermoplastic elastomer (TPE), a synthetic rubber and natural rubber, the content ratio of these thermoplastic materials may be adjusted according to the performance requirements of the product, as long as the total content of these thermoplastic materials is 100 parts by weight.

The blowing agent is a chemical blowing agent uniformly mixed in the thermoplastic material. When the thermoplastic material is processed at a high temperature, the blowing agent releases one or more gases (e.g., nitrogen or carbon dioxide) due to thermal decomposition, causing the thermoplastic material in the molten state to expand and foam, wherein the amount of the blowing agent added is based on the total content of the thermoplastic material, and can be adjusted depending on performance requirements of the product. In this embodiment, the amount of the blowing agent added is between 5-10 phr, as long as the thermoplastic material can be uniformly foamed. In one preferred embodiment, the type of the blowing agent includes an azo-type blowing agent for generating $N_2$, an ammonium compound for generating $NH_3$, and a mixture of carbonate and an acid for generating $CO_2$, for example, sodium bicarbonate, dinitrosopentamethylenetetramine, sulfonyl hydroxide, azodicarbonamide, p-toluenesulfonylsemicarbazide, 5-phenyltetrazole, diisopropyl azodicarboxylate, and sodium borohydride, but not limited thereto.

It is noting that, the unit "phr" (parts per hundred resin) as described herein refers to the parts by weight of additional additives added based on the total content of 100 parts by weight of the thermoplastic material.

The phase change material (PCM) is blended with the thermoplastic material, which is based on the material's ability to absorb or release latent heat when subjected to a physical phase change at a specific range of temperature. In brief, when the foam blend is heated at a high temperature, the phase change material is transformed from a solid phase to a molten state to cause an endothermic reaction and store thermal energy; when the foam blend is in the cooling process, the phase change material solidifies and releases the stored thermal energy. In this embodiment, the transition temperature of the phase change material is between 45° C.-100° C., and the phase change material is added in an amount of no more than 15 phr based on the total content of the thermoplastic material to mix with the thermoplastic material, that is, the amount of the phase change material added is greater than 1 phr and less than or equal to 15 phr. In one preferred embodiment, the transition temperature of the phase change material is between 45° C.-70° C., and the phase change material is added in an amount of no more than 10 phr to mix with the thermoplastic material. In yet another preferred embodiment, the transition temperature of the phase change material is between 55° C.-70° C.

Types of the phase change material include one or a combination of more than one of the group consisting of polyethylene glycol (PEG), a petroleum resin, a linear alkane ($C_{22}$-$C_{30}$), zinc octadecanoate and stearic acid. In this embodiment, when the phase change material includes a combination of two or more of polyethylene glycol (PEG), a petroleum resin, a linear alkane ($C_{22}$-$C_{30}$), zinc octadecanoate and stearic acid, the total amount of these phase change materials added is between 5-10 phr.

It is noting that, the phase change material may be selected from a variety of types depending on the product requirements and adjusted to a proper amount, and the amount of the phase change material added will affect the mechanical properties of a foamed shoe body made of the foam blend. For example, if the amount of the phase change material added is greater than 15 phr, the crosslinking degree of the foamed shoe body is insufficient, and thus the mechanical properties thereof are affected; if the amount of the phase change material added is less than 1 phr, the phase change material fails to provide the functions of absorbing heat and releasing latent heat because of its insufficient content. Accordingly, the range of the amount of the phase change material added in this embodiment can not only provide an excellent function of absorbing heat or releasing latent heat, but also maintain the inherent mechanical properties of the foamed shoe body that meet the standards.

The crosslinking agent is blended with the thermoplastic material. The crosslinking agent is added in an amount of 0.1-1.5 phr based on the total content of the thermoplastic material to mix with the thermoplastic material. In one preferred embodiment, the crosslinking agent is added in an amount of between 0.5-1.2 phr, wherein the crosslinking agent has a decomposition temperature of between 120° C.-150° C. to cause the crosslinking reaction. Types of the crosslinking agent include one or a combination of more than one of the group consisting of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP).

In one preferred embodiment, when the crosslinking agent uses any of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP), the crosslinking agent is added in an amount of 0.1-1.5 phr. In yet another preferred embodiment, when the crosslinking agent is a combination of two or more selected from triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP), each crosslinking agent is added in an amount of between 0.1-1.5 phr, respectively.

Thereby, the foam blend incorporating a phase change material has a phase change material with a particular transition temperature (45° C.-100° C.), and the phase change material is blended with the thermoplastic material in an amount of no more than 15 phr. Because the phase change material has the function of absorbing or releasing latent heat, when the foam blend is used to the process of foaming to make a foamed shoe body, the phase change material can shorten the time of cooling and shrinkage of the foamed shoe body, and further save energy consumption in the manufacturing process.

Referring to FIG. 1, another embodiment of the present invention provides a method for making a foamed shoe body from a foam blend incorporating a phase change material, involving the types and contents of the thermoplastic material, the blowing agent, the crosslinking agent and the phase change material in the foam blend of the foregoing embodiments. The method for making a foamed shoe body from a foam blend incorporating a phase change material comprises the follow steps:

Step S1: mixing the aforementioned thermoplastic material, the aforementioned blowing agent, the aforementioned crosslinking agent and the aforementioned phase change material to form the foam blend, wherein the blending means of the foam blend may be adjusted as required without limitation. For example, the blowing agent, the phase change material, and the crosslinking agent may be compounded with the thermoplastic material, so that the blowing agent, the phase change material, and the crosslinking agent are mixed with the thermoplastic material, respectively, and then granulated, that is, the foam blend forms a masterbatch. Alternatively, the blowing agent, the phase change material, the crosslinking agent and the thermoplastic material are respectively added to an injection extruder for blending to form the foam blend.

Step S2: filling the foam blend into a mold for heating and foaming to form a semi-finished product of the foamed shoe body. In one preferred embodiment, the foam blend is melted at high temperature and high pressure by an injection molding machine to form a flow state, and the molten foam blend is compressed and injected into the mold by the injection molding machine under the pressure of screws. At this time, the blowing agent in the foam blend generates gases due to heating, so that the foam blend expands and foams into the semi-finished product of the foamed shoe body, and the phase change material stores thermal energy during the heating and foaming process of the foam blend.

Step S3: removing the semi-finished product of the foamed shoe body from the mold after mold opening, and placing the semi-finished product of the foamed shoe body in an aging environment, wherein the temperature of the aging environment is not greater than the transition temperature of the phase change material, so that the phase change material releases the stored thermal energy in the aging environment, and shrinking and molding the semi-finished product of the foamed shoe body to form a finished product of the foamed shoe body, wherein the aging environment can be the indoor environment of the shoe manufacturing process or the inside space of an oven, and the temperature of the aging environment is between 0° C.-70° C. In one preferred embodiment, the temperature of the aging environment is between 0° C.-45° C. to simulate the ambient temperature indoor varied with the weather, and the time of cooling and shrinkage and the temperature condition in the aging environment can be adjusted depending on the requirements of the semi-finished product of the foamed shoe body.

In this embodiment, in the actual manufacturing process of the Step S3, the semi-finished product of the foamed shoe body is first placed in a first aging environment for cooling and shrinkage after being removed from the mold, wherein the first aging environment can be the inside space of an oven, and its temperature is set to 40° C.-45° C. Because the temperature of the first aging environment is set to lower than the transition temperature of the phase change material, the phase change material in the semi-finished product of the foamed shoe body is allowed to release the stored thermal energy, which maintains the semi-finished product of the foamed shoe body at a certain temperature, increases the thermal shrinkage efficiency of the semi-finished product of the foamed shoe body after mold opening, and shortens the time of cooling and shrinkage. At this time, the semi-finished product of the foamed shoe body forms a semi-finished product of the shrunk foamed shoe body in the first aging environment. Subsequently, the semi-finished product of the shrunk foamed shoe body is removed from the first aging environment, and then placed in a second aging environment for setting, wherein the second aging environment is the indoor environment of the shoe manufacturing process, and the temperature of the second aging environment corresponds to the indoor temperature in a range of 0° C.-45° C. without the need of making any additional adjustment to room temperature, so that the semi-finished product of the shrunk foamed shoe body is set into the finished product of the foamed shoe body at room temperature in the second aging environment, wherein both the semi-finished and finished products of the foamed shoe body are for foamed midsole/outsole structure, and the density of the finished product of the foamed shoe body is in a range of 0.10 to 0.30 g/cm$^3$.

In this embodiment, the semi-finished product of the foamed shoe body is placed in the first aging environment for 15 to 30 minutes for cooling and shrinkage to produce the semi-finished product of the shrunk foamed shoe body having a length dimension L1. The semi-finished product of the shrunk foamed shoe body is further cured to form a finished product of the foamed shoe body having a length dimension L2 after being placed in the second aging environment for about 7 days. The difference between the length dimension L2 of the finished product of the foamed shoe body and the length dimension L1 of the semi-finished product of the shrunk foamed shoe body is no more than 5%. After the semi-finished product of the foamed shoe body is placed in the first aging environment for cooling and shrinkage, the semi-finished product of the shrunk foamed shoe body has a width dimension W1. The semi-finished product of the shrunk foamed shoe body is further cured to form the finished product of the foamed shoe body having a width dimension W2 after being placed in the second aging environment. The difference between the width dimension W2 of the finished product of the foamed shoe body and the width dimension W1 of the semi-finished product of the shrunk foamed shoe body is no more than 5%. In one preferred embodiment, the difference between the length dimension L2 of the finished product of the foamed shoe body and the length dimension L1 of the semi-finished product of the shrunk foamed shoe body is no more than 2%, the difference between the width dimension W2 of the finished product of the foamed shoe body and the width dimension W1 of the semi-finished product of the shrunk foamed shoe body is no more than 2%.

In summary, the method for making a foamed shoe body from a foam blend incorporating a phase change material uses the foam blend of the foregoing embodiments. In the steps of the method, the foam blend has a phase change material with a particular transition temperature (45°

C.-100° C.). When the foam blend is heated and foamed in the mold, the phase change material can store thermal energy during the foaming process. When the semi-finished product of the foamed shoe body is removed from the mold and placed in the aging environment, since the aging environment temperature (0° C.-70° C.) is set lower than the transition temperature (45° C.-100° C.) of the phase change material, the phase change material in the semi-finished product of the foamed shoe body releases the stored thermal energy, which maintains the semi-finished product of the foamed shoe body at a certain temperature, promotes thermal shrinkage efficiency of the semi-finished product of the foamed shoe body after it is removed from the mold, and shortens the time of cooling and shrinkage.

It is particularly noted that, in this embodiment, the phase change material is selected from those having a particular transition temperature (45° C.-100° C.) to use in a process of making a foamed shoe body, which can indeed effectively shorten the time of cooling and shrinkage of the foamed shoe body. In the case that the phase change material has a transition temperature of below 45° C., because an oven is used in the aging environment in the general shoe making process and the temperature is set to 40° C.-45° C. it is actually easy to cause the transition temperature of the phase change material (<45° C.) to be lower than the aging environment temperature (40° C.-45° C.), so that the phase change material continues absorbing thermal energy in the aging environment to form a liquid state, and thus the phase change material may even cause a potential risk of leaking out of the surface of the semi-finished product of the foamed shoe body because it can't be cured, which will even lead to the problem of energy consumption. In the case that the phase change material has a transition temperature of above 100° C., although it can store thermal energy at the temperature of a common foam injection molding mold, if a low-temperature foam material is used in the shoe manufacturing process, the temperature of the foam injection molding mold is adjusted to below 100° C. in the foaming process, which may cause the phase change material with a transition temperature>100° C. to fail to play a role in storing thermal energy in the foam injection molding mold at a temperature of below 100° C. and further fail to achieve the purposes of phase change and energy conversion.

In addition, in the Step S3, the temperature of the aging environment is 0° C.-70° C., preferably 0° C.-45° C. Compared to conventional techniques, the present invention uses a low-temperature shrinkage condition and thus saves energy consumption in the manufacturing process. The aging environment may even be the indoor environment of the shoe manufacturing process, as long as the temperature of the aging environment is between 0° C.-70° C. and not greater than the transition temperature of the phase change material, so that the phase change material can release heat in response to the ambient temperature. In the process of shrinking and molding into the finished product of the foamed shoe body, the semi-finished product of the foamed shoe body can be aged and set at room temperature in the aging environment throughout the process without the need of making any additional adjustment to room temperature or using an oven device, thereby saving the usage cost of oven. And the method of the present invention can also stabilize the setting shrinkage of the finished product of the foamed shoe body, improve the shrinkage yield of the manufacturing process, and thereby maintain the quality of the finished product of the foamed shoe body.

In addition, in order to fully understand the purposes, features and efficacies of the present invention, these embodiments provide the finished products of the foamed shoe body made by incorporating different phase change materials in experimental groups and control groups, respectively. The surface temperature changes during the process of cooling and shrinkage were determined in experimental groups and control groups, respectively, and the mechanical properties corresponding to the incorporation of different phase change materials were tested in each experimental group.

I. Discussion on Surface Temperature Changes of the Foamed Shoe Bodies of Experimental Groups and Control Groups after Cooling and Shrinkage:

This test illustrates the basic compositions of Control Groups 1 and 2 and Experimental Groups 1-4, and the conditions of cooling and shrinkage of foamed shoe bodies made from the Control groups 1 and 2 and Experimental groups 1-4 respectively.

Control Group 1: Conventional foam raw materials for shoes were used without adding the phase change material. The foam raw materials for shoes substantially included a thermoplastic material, a blowing agent, and a crosslinking agent. Specifically, the foam raw materials for shoes were first formed into a semi-finished product of a foamed shoe body by injection foaming, and the semi-finished product of the foamed shoe body after being removed from the mold was placed in an oven for cooling and shrinkage at a temperature of 45° C.-40° C., that is, cooling at 45° C. for a period of time and then cooling down to 40° C. The total time of cooling and shrinkage was set to 20 minutes to determine the surface temperature change of the semi-finished product of the foamed shoe body after cooling and shrinkage.

Control Group 2: Conventional foam raw materials for shoes were used without adding the phase change material. The foam raw materials for shoes substantially included a thermoplastic material, a blowing agent, and a crosslinking agent. Specifically, the foam raw materials for shoes were first formed into a semi-finished product of a foamed shoe body by injection foaming, and the semi-finished product of the foamed shoe body after being removed from the mold was placed in an oven for cooling and shrinkage at a multi-stage temperature of 70° C.-60° C.-50° C.-45° C.-45° C., that is, cooling at a temperature of 70° C. for a period of time and then gradually cooling down to 45° C. The total time for cooling and shrinkage was set to 45 minutes to determine the surface temperature change of the semi-finished product of the foamed shoe body.

Experimental Group 1: The foam blend incorporating a phase change material according to this embodiment was used, which substantially comprised a thermoplastic material, a blowing agent, a crosslinking agent and a phase change material. The phase change material was stearic acid used alone which was added in an amount of 10 phr. Specifically, the foam blend was first formed into a semi-finished product of a foamed shoe body by injection foaming, and the semi-finished product of the foamed shoe body after being removed from the mold was placed in an oven for cooling and shrinkage at a temperature of 45° C.-40° C., that is, cooling at 45° C. for a period of time and then cooling down to 40° C. The total time of cooling and shrinkage was set to 20 minutes to determine the surface temperature change of the semi-finished product of the foamed shoe body after cooling and shrinkage.

Experimental Group 2: The foam blend incorporating a phase change material according to this embodiment was used, which substantially comprised a thermoplastic material, a blowing agent, a crosslinking agent and a phase change material. The phase change material was a combination of stearic acid and polyethylene glycol (PEG), wherein the stearic acid was added in an amount of 5 phr and the polyethylene glycol (PEG) was added in an amount of 5 phr. Specifically, the foam blend was first formed into a semi-finished product of a foamed shoe body by injection foaming, and the semi-finished product of the foamed shoe body after being removed from the mold was placed in an oven for cooling and shrinkage at a temperature of 45° C.-40° C., that is, cooling at 45° C. for a period of time and then cooling down to 40° C. The total time of cooling and shrinkage was set to 20 minutes to determine the surface temperature change of the semi-finished product of the foamed shoe body after cooling and shrinkage.

Experimental Group 3: The foam blend incorporating a phase change material according to this embodiment was used, which substantially comprised a thermoplastic material, a blowing agent, a crosslinking agent and a phase change material. The phase change material was polyethylene glycol (PEG) used alone which was added in an amount of 10 phr. Specifically, the foam blend was formed into a semi-finished product of a foamed shoe body by injection foaming and the semi-finished product of the foamed shoe body after being removed from the mold was placed in an oven for cooling and shrinkage at a temperature of 45° C.-40° C., that is, cooling at 45° C. for a period of time and then cooling down to 40° C. The total time of cooling and shrinkage was set to 20 minutes to determine the surface temperature change of the semi-finished product of the foamed shoe body after cooling and shrinkage.

Experimental Group 4: The foam blend incorporating a phase change material according to this embodiment was used, which substantially comprised a thermoplastic material, a blowing agent, a crosslinking agent and a phase change material. The phase change material was a petroleum resin used alone which was added in an amount of 10 phr. Specifically, the foam blend was first formed into a semi-finished product of a foamed shoe body by injection foaming, and the semi-finished product of the foamed shoe body after being removed from the mold was placed in an oven for cooling and shrinkage at a temperature of 45° C.-40° C., that is, cooling at 45° C. for a period of time and then cooling down to 40° C. The total time of cooling and shrinkage was set to 20 minutes to determine the surface temperature change of the semi-finished product of the foamed shoe body after cooling and shrinkage.

Figure 2:
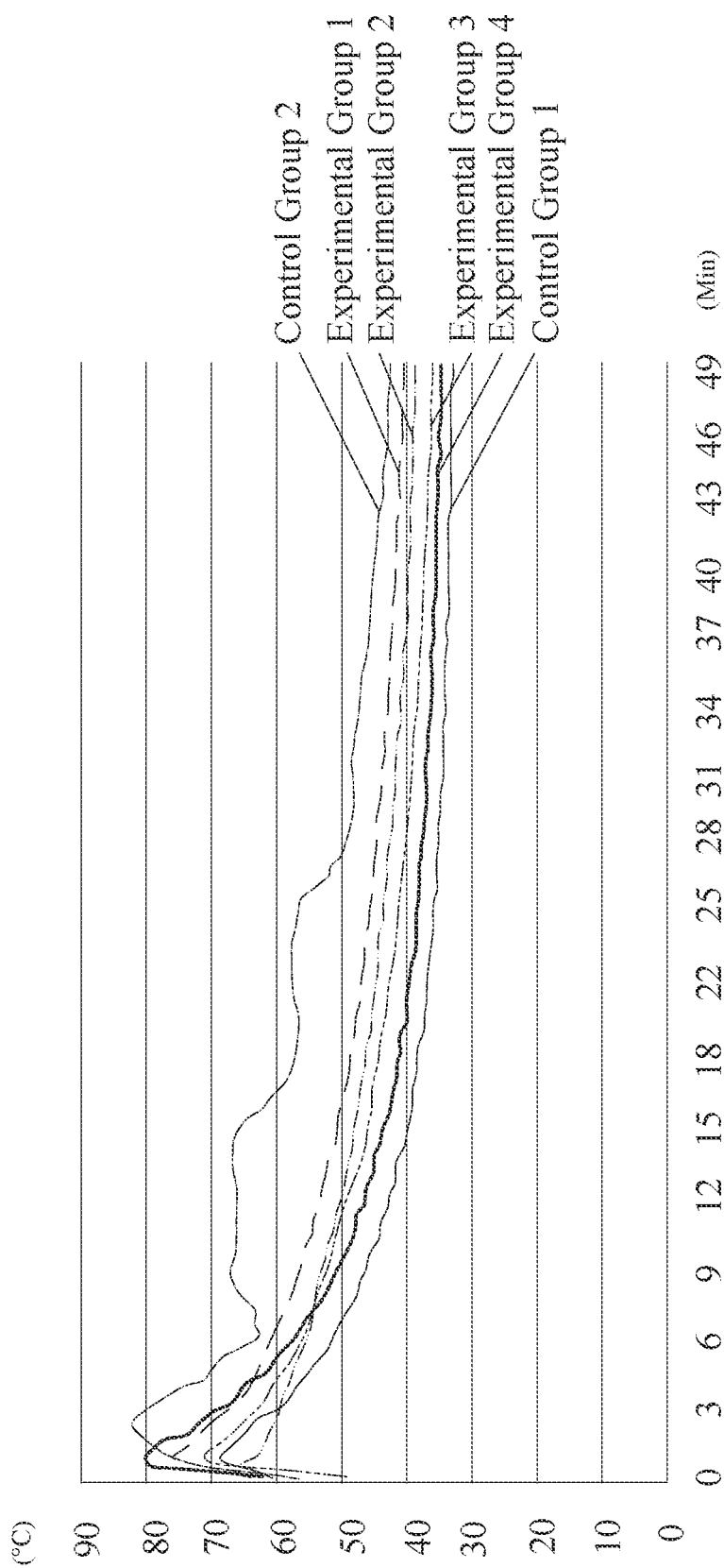
FIG. 2 is a graph showing surface temperature changes of the finished products of the foamed shoe body in various experimental groups and control groups detected respectively during the cooling and shrinkage processes according to one preferred embodiment of the present invention.

FIG. 2 shows the determination results of surface temperature change of Experimental Groups 1-4 and Control Groups 1 and 2. The semi-finished product of the foamed shoe body in Control Group 1 exhibited a significantly decrease in surface temperature as time increased. The semi-finished product of the foamed shoe body in Control Group 2 exhibited a significantly fluctuation in surface temperature, indicating an unstable temperature change. In the first 3 minutes, the semi-finished products of the foamed shoe body in Experimental Groups 1-4 were all measured to have a surface temperature of above 70° C. as the phase change materials released thermal energy, wherein the phase change material in Experimental Group 4 was selected from a petroleum resin, which had a better effect of releasing thermal energy. In addition, the phase change material in Experimental Group 1 was selected from stearic acid, and the phase change material in Experimental Group 2 comprised a combination of stearic acid and polyethylene glycol (PEG), both of which had an effect of extending the release of thermal energy, so that the surface temperatures of the semi-finished products of the foamed shoe body in Experimental Groups 1-2 were continuously maintained in a range of about 40° C. to 50° C.

II. Discussion on the Mechanical Properties of the Finished Products of the Foamed Shoe Body in Experimental Groups:

This test illustrates the basic compositions of Experimental Groups 5-9, and the finished products of the foamed shoe body in Experimental Groups 5-9 made by the process of this embodiment.

Experimental Group 5: The foam blend substantially comprised a thermoplastic material, a blowing agent, a crosslinking agent and a phase change material. The phase change material was polyethylene glycol (PEG) used alone, and the crosslinking agent used was di(tert-butylperoxyisopropyl)benzene (BIPB), wherein the polyethylene glycol (PEG) was added in an amount of 10 phr, and the di(tert-butylperoxyisopropyl)benzene (BIPB) was added in an amount of 0.55 phr.

Experimental Group 6: The foam blend substantially comprised a thermoplastic material, a blowing agent, a crosslinking agent and a phase change material. The phase change material was a petroleum resin used alone, and the crosslinking agent used was di(tert-butylperoxyisopropyl)benzene (BIPB), wherein the petroleum resin was added in an amount of 10 phr, and the di(tert-butylperoxyisopropyl)benzene (BIPB) was added in an amount of 0.55 phr.

Experimental Group 7: The foam blend substantially comprised a thermoplastic material, a blowing agent, a crosslinking agent and a phase change material. The phase change material was zinc octadecanoate used alone, and the crosslinking agent used was di(tert-butylperoxyisopropyl)benzene (BIPB), wherein the zinc octadecanoate was added in an amount of 10 phr, and the di(tert-butylperoxyisopropyl)benzene (BIPB) was added in an amount of 0.55 phr.

Experimental Group 8: The foam blend substantially comprised a thermoplastic material, a blowing agent, a crosslinking agent and a phase change material. The phase change material was stearic acid used alone, and the crosslinking agent used was di(tert-butylperoxyisopropyl)benzene (BIPB), wherein the stearic acid was added in an amount of 10 phr, and the di(tert-butylperoxyisopropyl)benzene (BIPB) was added in an amount of 0.55 phr.

Experimental Group 9: The foam blend substantially comprised a thermoplastic material, a blowing agent, a crosslinking agent and a phase change material. The phase change material was stearic acid used alone, and the crosslinking agent used was 1,1'-bis-(tert-butyl-peroxy)-3,3,5-trimethylcyclohexane (TMCH), wherein the stearic acid was added in an amount of 5 phr, and the 1,1'-bis-(tert-butyl-peroxy)-3,3,5-trimethylcyclohexane (TMCH) was added in an amount of 0.6 phr.

The finished products of the foamed shoe body in Experimental Groups 5-9 were subjected to tests of mechanical properties of foam midsole/outsole, including sun test, hardness, fatigue bending, resilience, compression set, determination of density, shrinkage, tear strength, tensile strength and breaking elongation, wherein Table I below specifically describes data of mechanical properties of the finished products of the foamed shoe body in Experimental Groups 5-9.

TABLE I

Mechanical Properties of Finished Products of Foamed Shoe Body in Experimental Groups 5-9

| Item | Experimental Group 5 | Experimental Group 6 | Experimental Group 7 | Experimental Group 8 | Experimental Group 9 |
|---|---|---|---|---|---|
| Vulcanization Torque (in kgf-cm) | 1.65 | 1.89 | 2.04 | 2.58 | 2.58 |
| Amount of phase change material added (phr) | 10 | 10 | 10 | 10 | 5 |
| Mechanical properties | | | | | |
| Sun test | 4 | 4 | 4 | 4-5 | 4-5 |
| Hardness (C) | 46 | 47 | 48 | 60.5 | 55 |
| Fatigue bending (cycles) | 50,000+ | 50,000+ | 50,000+ | 50,000+ | 50,000+ |
| Resilience (%) | 47 | 45 | 43 | 37.9 | 46 |
| Compression set (%) | 62.3 | 58.6 | 53 | 54.9 | 53 |
| Determination of density (g/cm$^3$) | 0.21 | 0.22 | 0.2 | 0.21 | 0.21 |
| Shrinkage (%) | L: 2.3 W: 2.2 | L: 2.1 W: 2.4 | L: 0.8 W: 0.8 | L: 0.4 W: 0.8 | L: 0.6 W: 1.0 |
| Tear strength (N/mm) | 3.8 | 3.2 | 4.1 | 4.4 | 4.1 |
| Tear strength (N/cm) | 32.2 | 27.4 | 29.4 | 29.8 | 27.8 |
| Tensile strength (Mpa) | 1.8 | 2.0 | 2.3 | 2.2 | 2.1 |
| Breaking elongation (%) | 270.0 | 259.0 | 265.0 | 254.9 | 269.0 |

Table I above shows data results regarding the mechanical properties of the finished products of the foamed shoe body in Experimental Groups 5-9, wherein the corresponding "L" in the row "shrinkage (%)" refers to a shrinkage of the finished product of the foamed shoe body in the length direction, and the corresponding "W" in the row "shrinkage (%)" refers to a shrinkage of the finished product of the foamed shoe body in the width direction.

Referring to Table I, the shrinkage data results of Experimental Groups 5-9 are demonstrated. Firstly, the shrinkage data of the finished products of the foamed shoe body in Experimental Groups 5-8 are compared, wherein the finished product of the foamed shoe body in Experimental Group 5 had a shrinkage of 2.3% in the length direction L, and a shrinkage of 2.2% in the width direction W; the finished product of the foamed shoe body in Experimental Group 6 had a shrinkage of 2.1% in the length direction L, and a shrinkage of 2.4% in the width direction W; the finished product of the foamed shoe body in Experimental Group 7 had a shrinkage of 0.8% in the length direction L, and a shrinkage of 0.8% in the width direction W; the finished product of the foamed shoe body in Experimental Group 8 had a shrinkage of 0.4% in the length direction L, and a shrinkage of 0.8% in the width direction W.

It can be seen that the finished products of the foamed shoe body had a dimensional shrinkage of about 2%-2.5% corresponding to the length direction L and the width direction W as determined in Experimental Groups 5 and 6; the finished products of the foamed shoe body had a dimensional shrinkage of less than 1% corresponding to the length direction L and the width direction W as determined in Experimental Groups 7 and 8. It is indicated that for finished products of the foamed shoe body in Experimental Groups 5-8 made by selecting different phase change materials, each of the finished products of the foamed shoe body had a dimensional setting shrinkage of no more than 3%, wherein zinc octadecanoate and stearic acid were used as the phase change materials in Experimental Groups 7 and 8, respectively, which significantly reduced the dimensional shrinkage error (less than 1%) of the finished products of the foamed shoe body and improved the shrinkage yield in the manufacturing process.

In addition, the shrinkages of the finished products of the foamed shoe body in Experimental groups 8 and 9 were compared, wherein Experimental Groups 8 and 9 both used stearic acid as a phase change material, the phase change materials in Experimental Groups 8 and 9 were added in an amount of 10 phr and 5 phr respectively, and Experimental Groups 8 and 9 selected different crosslinking agents, respectively. The finished product of the foamed shoe body in Experimental Group 9 had a shrinkage of 0.6% in the length direction L, and a shrinkage of 1.0% in the width direction W. It can be seen that the finished products of the foamed shoe body as determined in Experimental Groups 8-9 had a dimensional shrinkage of no more than 1.0% in both the length and width directions, demonstrating that with an amount of between 5-10 phr stearic acid as the phase change material, indeed significantly improved the shrinkage yields of the finished products of the foamed shoe body.

III. Discussions on Effects of Combinations of Phase Change Materials on the Setting Shrinkage Amount of Finished Products of the Foamed Shoe Body:

This test illustrates the basic compositions of Control Groups 3 and 4 and Experimental Group 10, and the conditions of cooling and shrinkage for the preparation of finished products of the foamed shoe body from Control Groups 3 and 4 and Experimental Group 10, wherein Table II below specifically discloses components, shrinkage conditions and data of setting shrinkage amount of Control Groups 3 and 4 and Experimental Group 10.

Control Group 3: The basic components included a thermoplastic material, a blowing agent, a crosslinking agent, a phase change material and various additives, wherein, the thermoplastic material was selected from ethylene-vinyl acetate (EVA) and its total content is 100 parts by weight, the blowing agent was an azo-type blowing agent added in an amount of 6.5 phr, the phase change material was selected from stearic acid added in an amount of 1 phr, and the crosslinking agent was selected from di(tert-butylperoxyisopropyl)benzene (BIPB) in an amount of 0.6 phr. The finished product of the foamed shoe body in Control Group 3 was cooled at a temperature of 70° C.-60° C.-50° C.-45° C.-45° C., which is a conventional multi-stage temperature control mode, and the total time of cooling and shrinkage was set to 45 minutes.

Control Group 4: The basic components included a thermoplastic material, a blowing agent, a crosslinking agent, a phase change material and various additives, wherein, the thermoplastic material was selected from ethylene-vinyl acetate (EVA) and its total content is 100 parts by weight, the blowing agent was an azo-type blowing agent added in an amount of 6.5 phr, the phase change material was selected from stearic acid added in an amount of 1 phr, and the crosslinking agent was selected from di(tert-butylperoxyisopropyl)benzene (BIPB) in an amount of is 0.6 phr. The finished product of the foamed shoe body in Control Group 4 was cooled at a temperature of 45° C.-40° C., that is, the temperature was set to 45° C. for a period of time and then dropped to 40° C. for cooling, and the total time of cooling and shrinkage was set to 20 minutes.

Experimental Group 10: The basic components included a thermoplastic material, a blowing agent, a crosslinking agent, a phase change material and various additives, wherein, the thermoplastic material was selected from ethylene-vinyl acetate (EVA) and its total content is 100 parts by weight, the blowing agent was an azo-type blowing agent added in an amount of 6.5 phr, the phase change material comprised stearic acid, a petroleum resin and zinc octadecanoate in a total amount of 5 phr, wherein the stearic acid was added in an amount of 2 phr, the petroleum resin in an amount of 2 phr, and the zinc octadecanoate in an amount of 1 phr; and the crosslinking agent comprised di(tert-butylperoxyisopropyl)benzene (BIPB) and 1,1'-bis-(tert-butyl-peroxy)-3,3,5-trimethylcyclohexane (TMCH) in a total amount of 1.15 phr, wherein the di(tert-butylperoxyisopropyl)benzene (BIPB) was added in an amount of 0.55 phr, and the 1,1'-bis-(tert-butyl-peroxy)-3,3,5-trimethylcyclohexane (TMCH) in an amount of 0.6 phr. The finished product of the foamed shoe body in Experimental Group 10 was cooled at a temperature of 45° C.-40° C., that is, the temperature was set to 45° C. for a period of time and then dropped to 40° C. for cooling, and the total time of cooling and shrinkage was set to 20 minutes.

TABLE II

Specific Components and Shrinkage Conditions of Experimental Group 10 and Control Groups 3 and 4

| Composition | Experimental Group 10 | Control Group 3 | Control Group 4 |
|---|---|---|---|
| EVA plastic pellets VA = 21 | 20 | | 10 |
| EVA plastic pellets VA = 28 | 80 | | 90 |
| Zinc oxide | 1.5 | | 1.5 |
| Stearic acid | 2 | | 1 |
| Petroleum resin | 2 | | 0 |
| Zinc octadecanoate | 1 | | 0 |
| BIPB (100%) crosslinking agent | 0.55 | | 0.6 |
| TMCH (40%) crosslinking agent | 0.6 | | 0 |
| azo-type blowing agent 50% | 6.5 | | 6.5 |
| Calcium carbonate | 10 | | 10 |
| PL300 crosslinking additive | 0.5 | | 0.5 |
| Urea blowing additive | 0.5 | | 0 |
| Black pigment | 2 | | 2 |
| Conditions of cooling and shrinkage and amount of setting shrinkage | | | |
| Temperature of aging environment | 45° C.-40° C. | 70° C.-60° C.-50° C.-45° C.-45° C. | 45° C.-40° C. |
| Time for Cooling and shrinkage | 20 minutes | 45 minutes | 20 minutes |
| Shrinkage of finished products of foamed shoe body (after molding process - stand for 1 week/ oven/UV irradiation) | 3.3 mm | 3.6 mm | 5.2 mm |

Referring to Table II, the results of shrinkage amount of Control Groups 3 and 4 and Experimental Group 10 are demonstrated. The finished product of the foamed shoe body in Control Group 3 had a setting shrinkage amount of 3.6 mm; the finished product of the foamed shoe body in Control Group 4 had a setting shrinkage amount of 5.2 mm; and the finished product of the foamed shoe body in Experimental Group 10 had a setting shrinkage amount of 3.3 mm. It can be seen that the finished products of the foamed shoe body in both Control Group 3 and Experimental Group 10 had a setting shrinkage amount significantly less than that of Control Group 4, and both Control Group 3 and Experimental Group 10 had a lower setting shrinkage.

Furthermore, the cooling and shrinkage condition of the finished product of the foamed shoe body in Experimental Group 10 was 45° C.-40° C. and the total time for cooling and shrinkage was 20 minutes. Compared with Control Group 3, the cooling and shrinkage condition of the foamed shoe body was 70° C.-60° C.-50° C.-45° C.-45° C., which is a conventional multi-stage temperature control mode, and the total time for cooling and shrinkage was 45 minutes. As such, the combination of phase change materials in Experimental Group 10 promoted thermal shrinkage of the finished product of the foamed shoe body, and shortened the shrinkage time accordingly. Also, the aging environment temperature of Experimental Group 10 used low-temperature shrinkage condition compared to conventional techniques and hence saved energy consumption in the manufacturing process.

IV. Discussions on Finished Products of the Foamed Shoe Body Having a Hardness of 48C, 52C and 55C Prepared Using Experimental Group 10 Above Described and Determination of Corresponding Mechanical Properties Thereof:

Table III specifically discloses test data on mechanical properties of the finished products of the foamed shoe body having a hardness of 48C, 52C and 55C prepared using Experimental Group 10 above described, including sun test, hardness, fatigue bending, resilience, compression set, determination of density, shrinkage, tear strength, tensile strength and breaking elongation.

TABLE III

Mechanical Properties of Finished Products of the Foamed Shoe Body Having a Hardness of 48C, 52C and 55C

| Item | 48C/52C/55C Specifications | 48C | 52C | 55C |
| --- | --- | --- | --- | --- |
| Sun test | ≥4 | 4 | 4 | 4 |
| Hardness (C) | 48 ± 3/52 ± 3/55 ± 3 | 47 | 51 | 54 |
| Fatigue bending (cycles) | 50,000+ | 50,000+ | 50,000+ | 50,000+ |
| Resilience (%) | >45/>40/>35 | 49 | 42 | 38 |
| Compression set (%) | <45/<60/<60 | 32.1 | 53.1 | 57 |
| Determination of density (g/cm$^3$) | 0.19-0.23 | 0.21 | 0.22 | 0.22 |
| Shrinkage (%) | <2.5/<2/<2 | 1.3 | 0.9 | 0.8 |
| Tear strength (N/mm) | >2/>3/>4 | 2.5 | 3.2 | 4.1 |
| Tear strength (N/cm) | >17/>27/>27 | 20.2 | 29.1 | 30.1 |
| Tensile strength (Mpa) | >2 | 2.2 | 2.8 | 3.2 |
| Breaking elongation (%) | >200 | 252 | 385 | 301 |

Referring to Table III, the difference of mechanical properties of the finished products of the foamed shoe body having a hardness of 48C, 52C and 55C is demonstrated, wherein all data of the finished products of the foamed shoe body having a hardness of 48C, 52C and 55C meet the performance standards of foam midsole/outsole, as determined in terms of sun test, hardness, fatigue bending, resilience, compression set, determination of density, shrinkage, tear strength, tensile strength and breaking elongation. It is worth noting that the finished products of the foamed shoe body having a hardness of 48C, 52C and 55C all have a setting shrinkage of below 2%, indicating that the endothermic and exothermic efficiencies of the phase change material in Experimental Group 10 would not affect the thermal shrinkage of the finished product of the foamed shoe body during the aging process due to different hardness thereof, so that the finished products of the foamed shoe body having a hardness of 48C, 52C and 55C have no significant difference in the setting shrinkage.

To sum up the test results, the foam blend in this embodiment is blended with a phase change material having a particular transition temperature (45° C.-100° C.). Because the phase change material has a function of absorbing or releasing latent heat, the foam blend is used in the process of foaming to make a foamed shoe body, and the phase change material stores thermal energy in the foaming process. Because the temperature of the aging environment (25° C.-70° C.) is lower than the transition temperature of the phase change material (45° C.-100° C.), the phase change material in the semi-finished product of the foamed shoe body releases the stored thermal energy to maintain the surface of the semi-finished product of the foamed shoe body at a certain temperature (cf. FIG. 2).

It is particularly noted that the phase change material releases thermal energy and hence improves the thermal shrinkage of the semi-finished product of the foamed shoe body in the process of aging and setting, thereby shortening the time of cooling and shrinkage. Moreover, the aging environment in this embodiment employs the low-temperature shrinkage conditions compared to conventional techniques, which saves energy consumption in the manufacturing process, reduces the setting shrinkage of the finished product of the foamed shoe body, and improves the shrinkage yield of the manufacturing process. Furthermore, the endothermic and exothermic functions of a phase change material would not affect the thermal shrinkage of the finished product of the foamed shoe body in the curing process due to the difference in the hardness of the finished products of the foamed shoe body, thereby maintaining the quality of the finished products of the foamed shoe body.

The above descriptions are merely preferred feasible embodiments of the present invention. All equivalent variations made by applying the description of the present invention and the scope of the patent application should be encompassed in the scope of the present invention.

The invention claimed is:

1. A method for making a foamed shoe body from a foam blend incorporating a phase change material, comprising the following steps:

Step S1: mixing a thermoplastic material, a blowing agent and at least one crosslinking agent with a phase change material to form a foam blend, wherein the phase change material is added in an amount of no more than 15 phr based on the total content of the thermoplastic material to mix with the thermoplastic material, wherein the transition temperature of the phase change material is 45° C.-100° C.;

Step S2: filling the foam blend into a mold for heating and foaming to form a semi-finished product of the foamed shoe body, wherein the phase change material stores thermal energy during the foaming process; and Step S3: removing the semi-finished product of the foamed shoe body from the mold after mold opening, and placing the semi-finished product of the foamed shoe body in an aging environment, wherein the temperature of the aging environment is not greater than the transition temperature of the phase change material, and the phase change material releases the stored thermal energy in the aging environment, so that the semi-finished product of the foamed shoe body shrinks into a finished product of the foamed shoe body.

2. The method for making a foamed shoe body from a foam blend incorporating a phase change material according to claim 1, wherein in the Step S1, the phase change material has a transition temperature of 55° C.-70° C., and is added in an amount of no more than 10 phr to mix with the thermoplastic material.

3. The method for making a foamed shoe body from a foam blend incorporating a phase change material according to claim 2, wherein in the Step S1, the phase change material includes one or a combination of more than one of the group consisting of polyethylene glycol (PEG), a petroleum resin, a linear alkane ($C_{22}$-$C_{30}$), zinc octadecanoate and stearic acid; when the phase change material includes a combination of two or more of polyethylene glycol (PEG), a petroleum resin, a linear alkane ($C_{22}$-$C_{30}$), zinc octadecanoate and stearic acid, the amount of the phase change material added is 5-10 phr.

4. The method for making a foamed shoe body from a foam blend incorporating a phase change material according to claim 3, wherein in the Step 1, the at least one crosslinking agent is added in an amount of 0.1-1.5 phr based on the total content of the thermoplastic material to mix with the thermoplastic material.

5. The method for making a foamed shoe body from a foam blend incorporating a phase change material according to claim 4, wherein in the Step S1, the at least one crosslinking agent includes one or a combination of more than one of the group consisting of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP).

6. The method for making a foamed shoe body from a foam blend incorporating a phase change material according to claim 5, wherein when the at least one crosslinking agent includes any of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP), the crosslinking agent is added in an amount of between 0.1-1.5 phr; when the at least one crosslinking agent includes a combination of two or more of triallyl isocyanurate (TAIC), 1,1'-bis-(tert-butyl-peroxy)-3,3,5-trimethylcyclohexane (TMCH), tert-butylperoxy-2-ethylhexyl carbonate (TBEC), 2,5-dimethyl-2,5-bis(tert-butylperoxy) hexane (DBPH), di(tert-butylperoxyisopropyl)benzene (BIPB), benzoyl peroxide (BPO), and dicumyl peroxide (DCP), each crosslinking agent is added in an amount of between 0.1-1.5 phr.

7. The method for making a foamed shoe body from a foam blend incorporating a phase change material according to claim 6, wherein the at least one crosslinking agent includes a combination of 1,1'-bis-(tert-butyl-peroxy)-3,3,5-trimethylcyclohexane (TMCH) and di(tert-butylperoxyisopropyl)benzene (BIPB).

8. The method for making a foamed shoe body from a foam blend incorporating a phase change material according to claim 1, wherein in the Step S1, the content of thermoplastic material accounts for 100 parts by weight of the total content of the foam blend; wherein the thermoplastic material includes one or a combination of more than one of the group consisting of polyurethane (PU), polyethylene (PE), ethylene vinyl acetate (EVA), a polyolefin elastomer (POE), a thermoplastic elastomer (TPE), a synthetic rubber and natural rubber; the blowing agent is added in an amount of 5-10 phr based on the total content of the thermoplastic material to mix with the thermoplastic material.

9. The method for making a foamed shoe body from a foam blend incorporating a phase change material according to claim 1, wherein in the Step S3, the semi-finished product of the foamed shoe body after removed from the mold is first placed in a first aging environment for cooling and shrinkage, wherein the temperature of the first aging environment is set to 40° C.-45° C. and the time of cooling and shrinkage is between 15-30 minutes; the phase change material in the semi-finished product of the foamed shoe body releases the stored thermal energy to promote the thermal shrinkage of the semi-finished product of the foamed shoe body after the semi-finished product of the foamed shoe body is removed from the mold, so that the semi-finished product of the foamed shoe body forms a semi-finished product of the shrunk foamed shoe body in the first aging environment; subsequently, the semi-finished product of the shrunk foamed shoe body is removed from the first aging environment, and placed in a second aging environment for 7 days for curing and setting; the temperature of the second aging environment is between 0° C.-45° C., so that the semi-finished product of the shrunk foamed shoe body product is set into a finished product of the foamed shoe body in the second aging environment.

10. The method for making a foamed shoe body from a foam blend incorporating a phase change material according to claim 9, wherein the length dimension of the semi-finished product of the shrunk foamed shoe body is L1, the length dimension of the finished product of the foamed shoe body is L2, and the difference between the length dimension L2 of the finished product of the foamed shoe body and the length dimension L1 of the semi-finished product of the shrunk foamed shoe body is no more than 5%; the width dimension of the semi-finished product of the shrunk foamed shoe body is W1, the width dimension of the finished product of the foamed shoe body is W2, and the difference between the width dimension W2 of the finished product of the foamed shoe body and the width dimension W1 of the semi-finished product of the shrunk foamed shoe body is no more than 5%.

11. The method for making a foamed shoe body from a foam blend incorporating a phase change material according to claim 1, wherein in the Step S3, the aging environment is an indoor environment, and the temperature of the aging environment is between 0° C.-70° C.; and in the process of shrinking and molding into the finished product of the foamed shoe body, the semi-finished product of the foamed shoe body is aged and set at room temperature in the aging environment.

* * * * *